(12) United States Patent
Takasaki et al.

(10) Patent No.: US 9,592,872 B2
(45) Date of Patent: Mar. 14, 2017

(54) MOTORCYCLE

(71) Applicant: HONDA MOTOR CO., LTD., Tokyo (JP)

(72) Inventors: Atsushi Takasaki, Wako (JP); Takashi Sasaki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 85 days.

(21) Appl. No.: 14/310,639

(22) Filed: Jun. 20, 2014

(65) Prior Publication Data

US 2015/0014080 A1 Jan. 15, 2015

(30) Foreign Application Priority Data

Jul. 10, 2013 (JP) .................................. 2013-144526

(51) Int. Cl.
| | | |
|---|---|---|
| *B60K 11/00* | (2006.01) | |
| *B62J 15/00* | (2006.01) | |
| *B62K 11/00* | (2006.01) | |
| *B62K 11/04* | (2006.01) | |

(52) U.S. Cl.
CPC ............... *B62J 15/00* (2013.01); *B62K 11/00* (2013.01); *B62K 11/04* (2013.01)

(58) Field of Classification Search
CPC .......... B60K 11/08; B60K 11/06; F01P 11/10; B60R 19/00; B62D 25/18
USPC ......................................... 180/68.1; 293/113
See application file for complete search history.

(56) References Cited

U.S. PATENT DOCUMENTS

| | | | | | |
|---|---|---|---|---|---|
| 4,428,451 | A | * | 1/1984 | Yamaoka | ................... F01P 3/18 123/65 EM |
| 4,564,081 | A | * | 1/1986 | Hamane | ..................... B62J 7/00 180/229 |
| 4,822,067 | A | * | 4/1989 | Matsuo | ..................... B62J 15/00 180/229 |
| 4,982,973 | A | * | 1/1991 | Saito | ...................... B60K 11/08 180/229 |
| 5,984,035 | A | * | 11/1999 | Katoh | .................... B62K 11/04 180/229 |
| 8,006,792 | B2 | * | 8/2011 | Nakao | ...................... B62J 17/00 180/229 |
| 8,146,693 | B2 | * | 4/2012 | Oohashi | ................. B60K 13/02 180/68.3 |

(Continued)

FOREIGN PATENT DOCUMENTS

| | | | |
|---|---|---|---|
| JP | 58177717 A | * | 10/1983 |
| JP | 05338571 A | * | 12/1993 |
| JP | 5338571 B2 | | 11/2013 |

*Primary Examiner* — Joseph Rocca
*Assistant Examiner* — Daniel Yeagley
(74) *Attorney, Agent, or Firm* — Westerman, Hattori, Daniels & Adrian, LLP (57) ABSTRACT

A motorcycle is provided which can enhance a cooling effect of a radiator while suppressing traveling resistance generated by a front fender. In a motorcycle which includes a front fender which is arranged between the left and right fork assemblies which constitute a front fork, and covers the front wheel from above, radiators are provided as a pair of left and right radiators, respective inner edges of the left and right radiators and the front fender overlap with each other as viewed from a front side, and a pair of left and right openings which extends in a vertical direction is formed in a rear portion of the front fender.

8 Claims, 11 Drawing Sheets

(56) References Cited

U.S. PATENT DOCUMENTS

| | | | | |
|---|---|---|---|---|
| 8,292,021 B2* | 10/2012 | Fukuyama | ............ | B60T 8/3685 |
| | | | | 180/225 |
| 2003/0121708 A1* | 7/2003 | Laivins | .................... | B62J 15/00 |
| | | | | 180/229 |

* cited by examiner

MOTORCYCLE

CROSS-REFERENCE TO RELATED APPLICATIONS

The present application claims priority under 35 U.S.C. §119 to Japanese Patent Application No. 2013-144526, filed Jul. 10, 2013, the contents of which are incorporated herein, by reference, in their entirety.

TECHNICAL FIELD

The present invention relates to a motorcycle provided with a front fender.

BACKGROUND OF THE INVENTION

Conventionally, there has been known a vehicle provided with a front fender which covers a front wheel from above (see JP 05338571 A; published Dec. 21, 1993, for example).

According to the invention described in JP 05338571 A; published Dec. 21, 1993 there is disclosed a motorcycle where an opening is formed in a front portion of a front fender. Traveling resistance generated by the front fender can be reduced due to this opening.

SUMMARY OF THE INVENTION

On the other hand, in a motorcycle provided with a radiator behind a front wheel, it is desirable that traveling wind is positively guided to the radiator.

A motorcycle is provided which can enhance a cooling effect of a radiator while suppressing traveling resistance generated by a front fender.

According to a first aspect, a motorcycle includes: a main frame which extends rearward and downward from a head pipe; an engine which has a cylinder axis extending in a vertical direction and is arranged below the main frame; radiators which are provided in front of the engine; a front fork which is supported on a steering shaft which is rotatably supported on the head pipe; a bridge which connects intermediate portions of left and right fork assemblies which constitute the front fork; and a front fender which is arranged below the bridge and between the left and right fork assemblies, and covers the front wheel from above. The radiators are provided as a pair of left and right radiators, respective inner edges of the left and right radiators and the front fender overlap with each other as viewed from a front side, and a pair of left and right openings which extends in a vertical direction is formed in a rear portion of the front fender.

According to a second aspect, the openings may be arranged within a vertical width of the radiators.

According to a third aspect, the opening may be divided into upper and lower openings at a middle portion thereof.

According to a fourth aspect, the respective inner edges of the left and right radiators and the openings may overlap with each other as viewed from a front side.

According to a fifth aspect, guides may be provided to the inner edges of the radiators respectively in an extending manner toward the openings.

According to the first aspect, the radiators are provided as a pair of left and right radiators, the respective inner edges of the left and right radiators and the front fender overlap with each other as viewed from a front side, and a pair of left and right openings which extends in a vertical direction is formed in the rear portion of the front fender. The openings formed in the front fender allow traveling wind to pass therethrough and hence, traveling resistance generated by the front fender can be suppressed and, at the same time, the traveling wind which passes through the openings is made to impinge on the radiator whereby a cooling effect of a radiator can be enhanced.

According to the second aspect, the openings are arranged within a vertical width of the radiators and hence, traveling wind which passes through the openings impinges on the radiators whereby a cooling effect of the radiators can be further enhanced.

According to the third aspect, the opening is divided into upper and lower openings at a middle portion thereof By dividing the opening into the upper and lower openings at the middle portion thereof by connecting middle parts of the opening, rigidity of the front fender can be enhanced.

According to the fourth aspect, the respective inner edges of the left and right radiators and the openings overlap with each other as viewed from a front side and hence, some of the traveling wind which impinges on the inner edges of the left and right radiators through the openings can be made to flow inside the radiators in a vehicle width direction, whereby traveling resistance can be suppressed compared to a case where the traveling wind is made to impinge on center portions of the radiators.

According to the fifth aspect, the guides are provided to the inner edges of the radiators respectively in an extending manner toward the openings and hence, traveling wind which flows toward the inner edges of the radiators from the openings can be guided to the radiators by the guides whereby an amount of traveling wind which impinges on the radiators can be increased thus further enhancing a cooling effect of the radiator.

BRIEF DESCRIPTION OF THE DRAWINGS

The advantages of the invention will become apparent in the following description taken in conjunction with the drawings, wherein.

DETAILED DESCRIPTION OF THE INVENTION

Hereinafter, one embodiment of the invention is explained by reference to drawings. In the explanation made hereinafter, the expressions relating to directions such as "frontward", "rearward", "leftward", "rightward", "upward", and "downward" are identical with the directions with respect to a vehicle body unless otherwise specified. Further, in the respective drawings, symbol FR indicates "front side of the vehicle", symbol UP indicates "upper side of the vehicle", and symbol LE indicates "left side of the vehicle".

Figure 1:
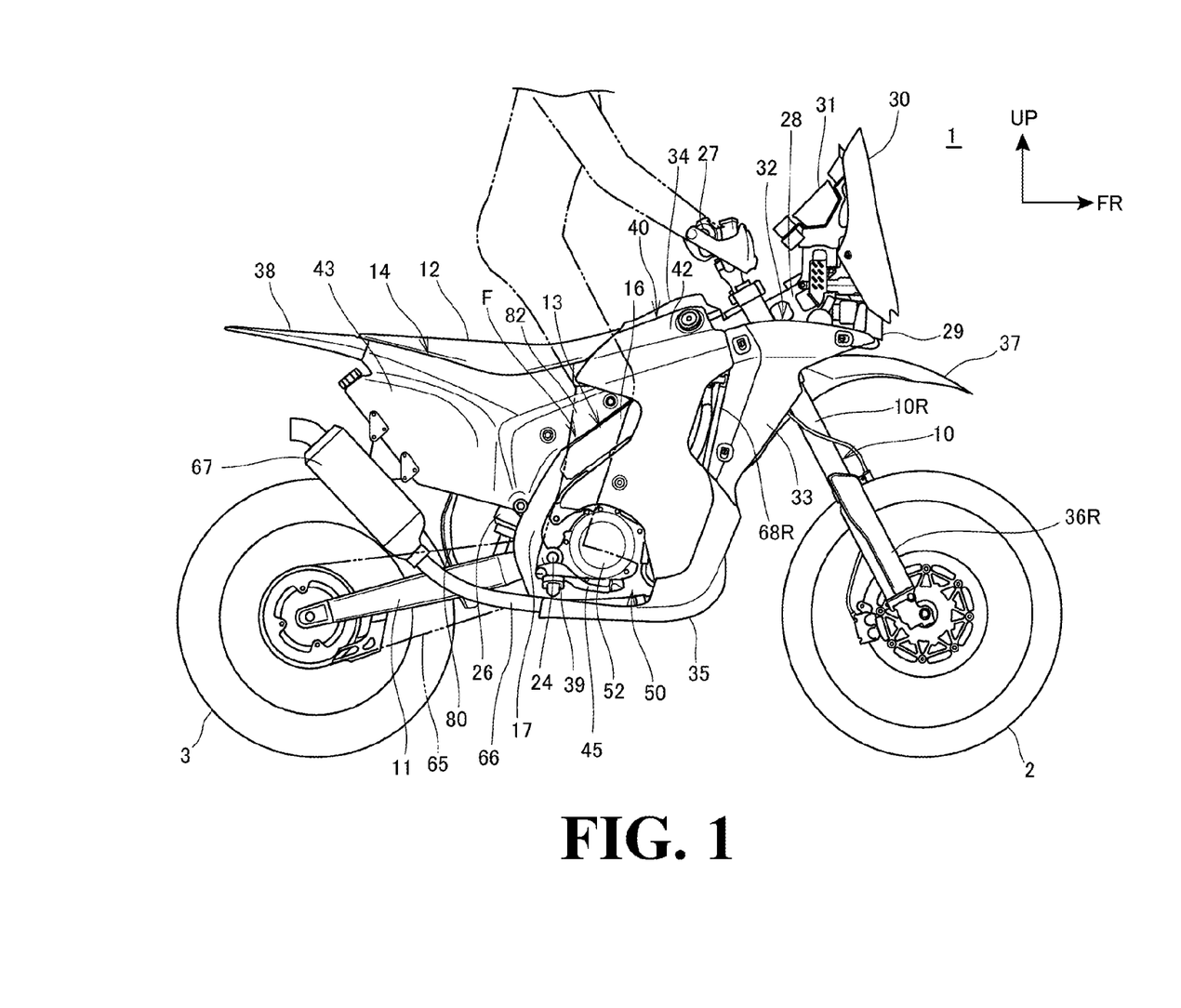
FIG. 1 is a right side view of a motorcycle according to an embodiment.
Figure 2:
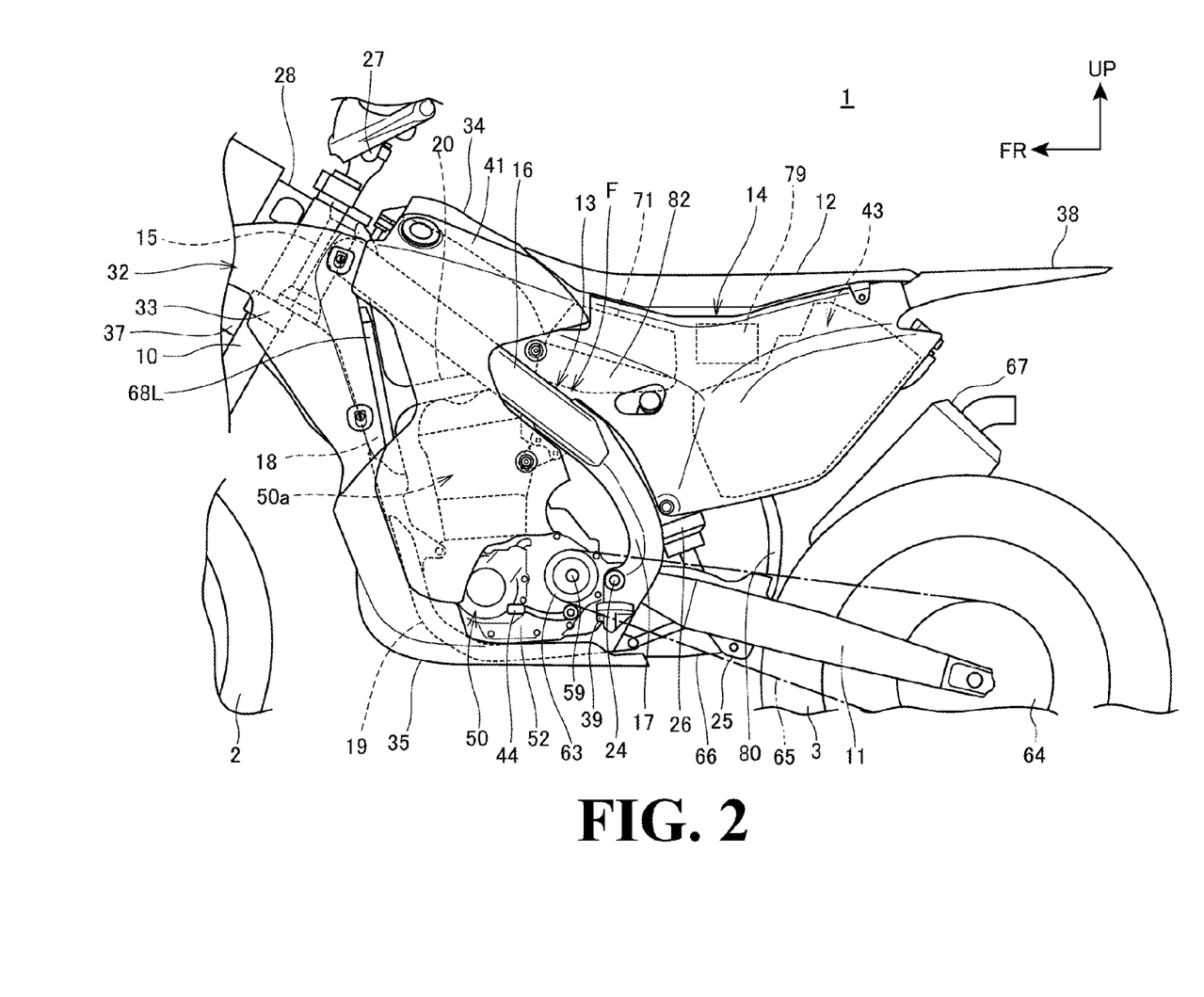
FIG. 2 is a left side view of the motorcycle.

FIG. 1 is a right side view of a motorcycle 1 according to an embodiment of the invention. FIG. 2 is a left side view of the motorcycle 1.

The motorcycle 1 is a vehicle where an engine 50 which constitutes a power unit is supported on a vehicle body frame F, a front fork 10 which supports a front wheel 2 is steerably supported on a front end of the vehicle body frame F, and a swing arm 11 which supports a rear wheel 3 is mounted on a rear portion of the vehicle body frame F.

The motorcycle 1 is a saddle-ride-type vehicle where a seat 12 on which a rider is seated in a straddling manner is arranged above a center portion of the vehicle body frame F in the longitudinal direction of the vehicle body frame F. Further, the motorcycle 1 is an off-road-type vehicle suitable for traveling on an uneven ground such as a sandy place. The motorcycle 1 has a large suspension stroke, and includes a large-sized fuel tank 40.

Figure 3:
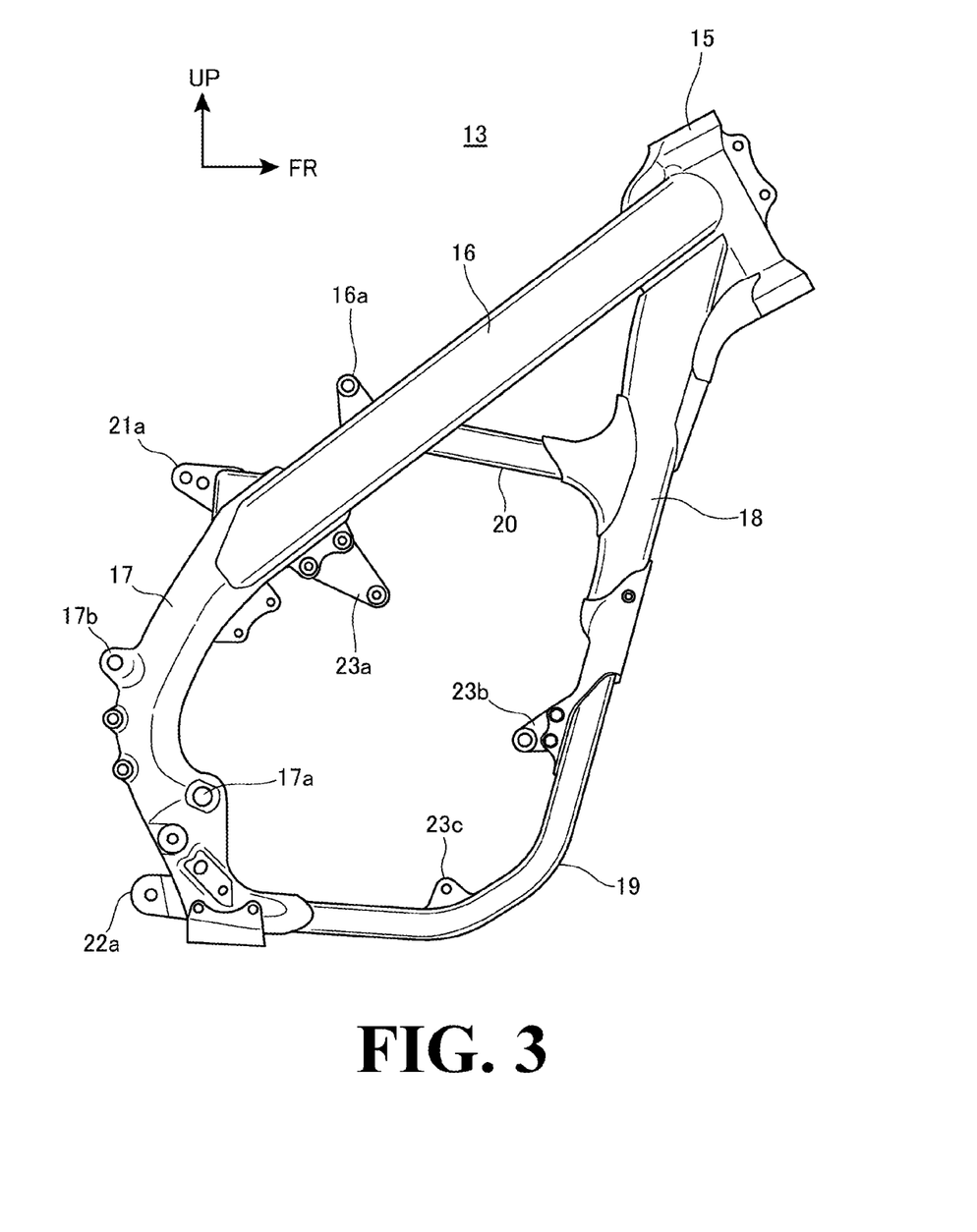
FIG. 3 is a right side view of a vehicle body frame.
Figure 4:
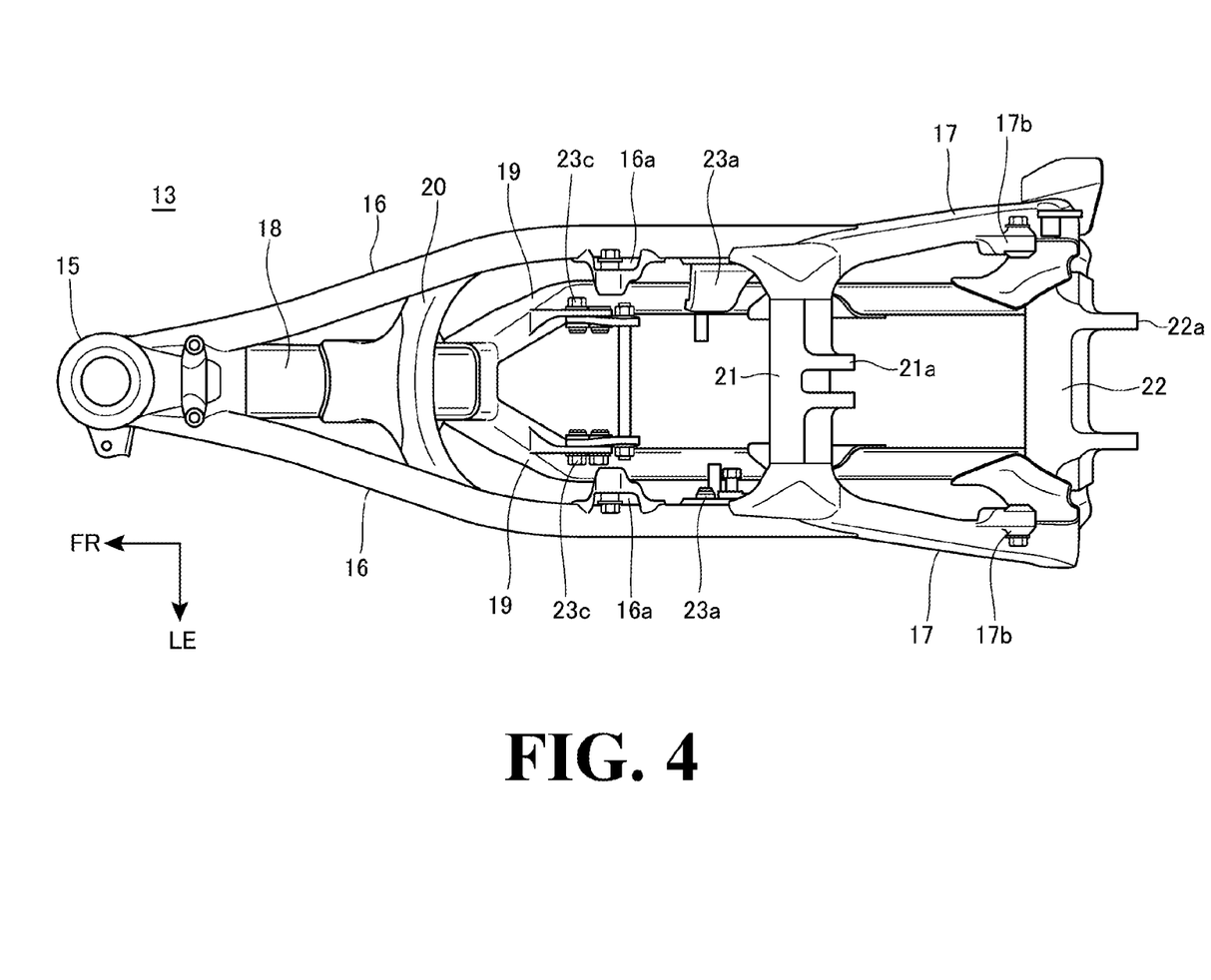
FIG. 4 is a plan view of the vehicle body frame.

FIG. 3 is a right side view of the vehicle body frame F. FIG. 4 is a plan view of the vehicle body frame F.

As shown in FIG. 1 to FIG. 4, the vehicle body frame F is constituted of: a front frame 13 which is formed into a basket shape by joining pipe members and plate members to each other by welding or the like; and a resin-made rear frame 14 which is connected to a rear portion of the front frame 13.

The front frame 13 includes: a head pipe 15 which is provided at a front end of the front frame 13; a pair of left and right main frames 16 which extend in an inclined manner in the oblique rearward and downward direction from the head pipe 15; and a pair of left and right pivot frames 17 which extend downward from rear ends of the respective main frames 16. The front frame 13 also includes a down frame 18 which extends rearward and downward from a rear face of a lower portion of the head pipe 15; and under frames 19 which extend downward after being branched to left and right sides from the down frame 18 and, thereafter, are bent rearward approximately horizontally, and are connected to lower ends of the pivot frames 17.

The front frame 13 includes a reinforcing frame 20 which connects an upper portion of the down frame 18 and middle portions of the main frames 16 in the longitudinal direction to each other. Further, the front frame 13 includes: an upper cross member 21 which connects upper portions of the left and right pivot frames 17 in the vehicle width direction; and a lower cross member 22 which connects lower portions of the pivot frames 17 in the vehicle width direction.

Engine stays 23a, 23b, and 23c to which the engine 50 is fixed are mounted on rear portions of the main frames 16, upper portions of the under frames 19, and front ends of horizontal portions of the under frames 19.

A pivot hole portion 17a for supporting a pivot shaft 24 of the swing arm 11 is formed on lower portions of the pivot frames 17 respectively. The swing arm 11 has a front end thereof swingably and pivotally supported on the pivot shaft 24, and the rear wheel 3 is pivotally supported on a rear end of the swing arm 11.

A suspension connecting stay 21a which projects rearward is mounted on the upper cross member 21. A link connecting stay 22a which projects rearward is mounted on the lower cross member 22, and a link mechanism 25 which is connected to the swing arm 11 is connected to the link connecting stay 22a. A cylindrical rear suspension unit 26 has an upper end thereof connected to the suspension connecting stay 21a, has a lower end thereof connected to the link mechanism 25, and is arranged in a frontwardly inclined posture.

An upper frame stay 16a which projects upward is mounted on upper faces of the rear portions of the main frames 16 respectively.

A lower frame stay 17b which projects rearward is mounted on rear faces of middle portions of the pivot frames 17 in the vertical direction respectively.

The front fork 10 is rotatably and pivotally supported on the head pipe 15 by way of a steering shaft (not shown in the drawing), and the front wheel 2 is pivotally supported on a lower end of the front fork 10. A steering handle 27 is fixed to an upper end of the front fork 10.

A front stay 28 which projects frontward is fixed to a front portion of the head pipe 15, and a headlight 29, a plate-shaped wind screen 30 and meters 31 are supported on the front stay 28.

The fuel tank 40 includes: a pair of left and right front tanks 41 and 42 which is arranged on left and right sides of the respective main frames 16 in a divided manner; and a rear tank 43 which is arranged in the rear frame 14.

The seat 12 extends rearward contiguously with rear portions of the front tanks 41 and 42, and is supported on an upper portion of the rear frame 14.

The motorcycle 1 includes a resin-made vehicle body cover 32. The vehicle body cover 32 includes: a pair of left and right shrouds 33 which cover an upper portion of the front fork 10 and the down frame 18 from lateral sides of the motorcycle 1; a tank cover 34 which covers the front tanks 41 and 42 from above; an under cover 35 which covers the under frame 19 and a crankcase 52 of the engine 50 from a front side and from below; and a pair of left and right fork covers 36L and 36R (only the right fork cover 36R shown in the drawing) which covers a lower portion of the front fork 10.

A front fender 37 which covers the front wheel 2 from above is fixed to the front fork 10. A rear fender 38 which covers the rear wheel 3 from above is fixed to the rear frame 14 behind the seat 12.

A pair of left and right steps 39 on which a rider places his feet is mounted on lower ends of the pivot frames 17 respectively. A shift pedal 44 is arranged in front of the left step 39, and a brake pedal 45 is arranged in front of the right step 39.

Figure 5:
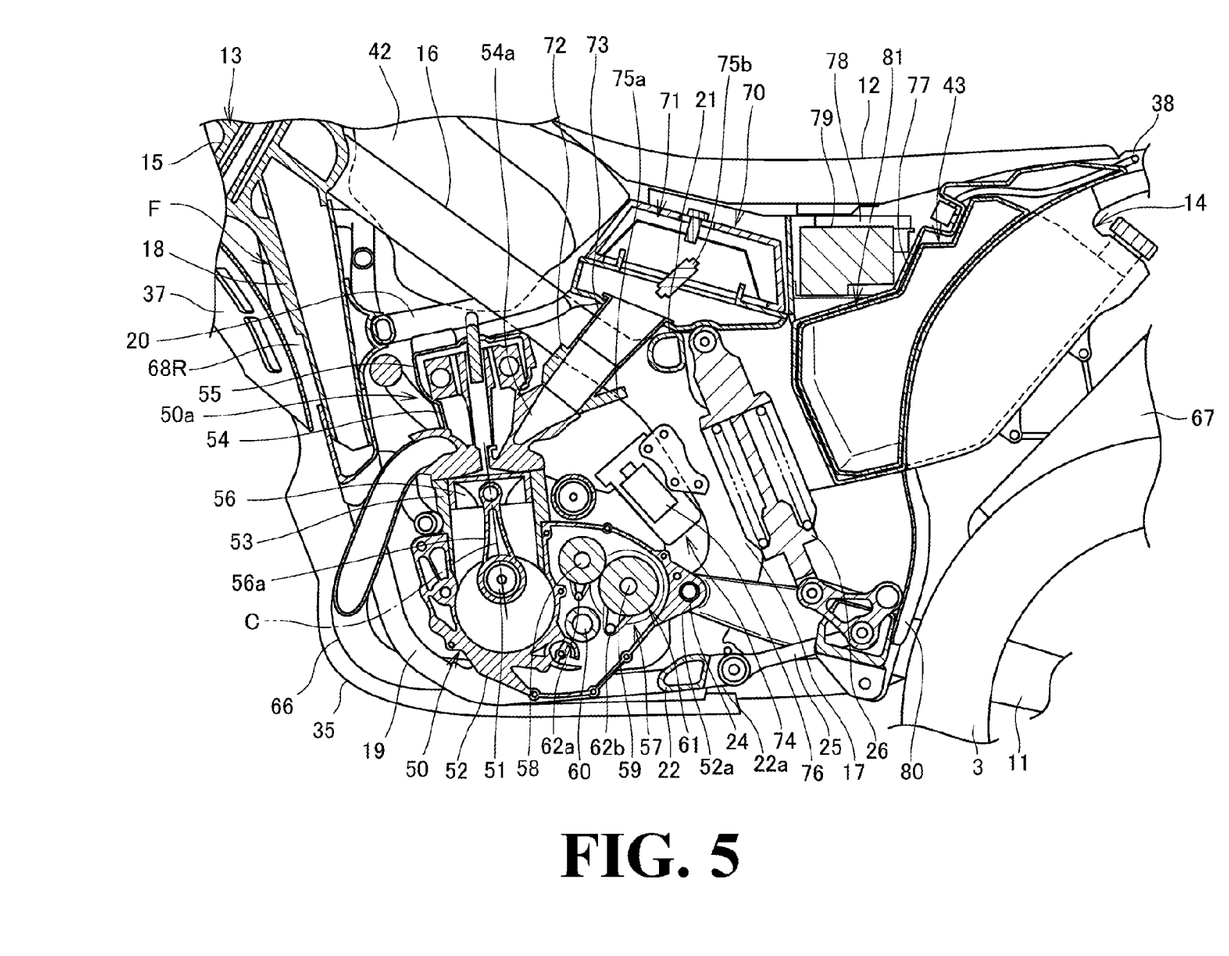
FIG. 5 is a cross-sectional view of the constitution of an engine and the surrounding of the engine.

FIG. 5 is a cross-sectional view of the constitution of the engine 50 and the surrounding of the engine 50.

As shown in FIG. 1, FIG. 2 and FIG. 5, the engine 50 is a water-cooled single-cylinder 4-cycle engine, and is supported in the inside of the basket-shaped front frame 13. A crankshaft 51 of the engine 50 is arranged in a horizontally extending manner in the vehicle width direction. The engine 50 includes the crankcase 52, and a cylinder portion 50a which projects upward from an upper face of a front portion of the crankcase 52. The cylinder portion 50a includes: a cylinder 53; a cylinder head 54 which is connected to an upper face of the cylinder 53; and a head cover 55 which covers a valve operating chamber of the cylinder head 54. The engine 50 has a cylinder axis C thereof slightly inclined frontward with respect to the vertical direction. A piston 56 which is connected to the crankshaft 51 by way of a connecting rod 56a is arranged in the inside of the cylinder 53.

An upper portion of the head cover 55 overlaps with a lower edge of the reinforcing frame 20 as viewed in a side view.

While being supported on the above-mentioned engine stays 23a, 23b, and 23c, the engine 50 is also supported on the front frame 13 by inserting the pivot shaft 24 into a fixed portion 52a formed on a rear portion of the crankcase 52.

A transmission 57 is incorporated in a rear portion of the engine 50. The transmission 57 includes: an input shaft 58 which is driven by the crankshaft 51; an output shaft 59 which is arranged parallel to the input shaft 58; and a shift drum 60 which is rotated due to a gear shifting operation by the shift pedal 44. A constant mesh gear train 61 is mounted on the input shaft 58 and the output shaft 59. The gear shifting is performed by changing over the gear train 61 by shift forks 62a and 62b which are interlocked with the shift drum 60.

The output shaft 59 projects leftward from a rear portion of the crankcase 52, and a drive sprocket 63 (FIG. 2) is fixed to a shaft end of the output shaft 59. An output of the engine 50 is transmitted to the rear wheel 3 by way of a drive chain 65 which is extended between and wounded around the drive sprocket 63 and a driven sprocket 64 of the rear wheel 3. The drive sprocket 63 is covered with a sprocket cover (not shown in the drawing).

An exhaust pipe 66 of the engine 50 extends frontward and downward from a front face of the cylinder head 54, is pulled out to a right side, extends rearward along the under frame 19, and is connected to a muffler 67 which is arranged on a right side of the rear wheel 3. The muffler 67 is supported on the rear frame 14.

A pair of plate-shaped radiators 68L and 68R in which cooling water for cooling the engine 50 circulates is arranged between the down frame 18 and a pair of left and right shrouds 33 respectively.

The front tanks 41 and 42 extend between the shrouds 33 and the rear frame 14 respectively, and extend downward from the lateral outside of the main frames 16, and have a size which allows the front tanks 41 and 42 to cover an area including the cylinder portion 50a and lateral sides of the front portion of the crankcase 52.

An intake device 70 of the engine 50 is arranged below the seat 12 and behind the cylinder head 54. The intake device 70 includes: an air cleaner 71 which takes outside air therein after cleaning the outside air; a throttle body 72 which is connected to an intake port 54a of the cylinder head 54; and a connecting tube 73 which connects the throttle body 72 and the air cleaner 71 to each other.

The air cleaner 71 is arranged behind the front tanks 41 and 42 contiguously, and is positioned above the rear suspension unit 26. In this embodiment, the air cleaner 71, the connecting tube 73, and the throttle body 72 are arranged linearly in the frontward and downward direction toward an engine 50 side and hence, an intake resistance is decreased whereby the engine 50 can acquire high intake efficiency.

A fuel supply device 74 for the engine 50 is arranged below the intake device 70. The fuel supply device 74 includes: injectors 75a and 75b which inject fuel into an intake passage formed in the throttle body 72, and a fuel pump 76 which supplies fuel to the injectors 75a and 75b.

Fuel in the front tanks 41 and 42 and fuel in the rear tank 43 are merged, the merged fuel is sucked by a fuel pump 76 and is discharged to the injectors 75a and 75b from the fuel pump 76.

The fuel pump 76 is formed in a cylindrical shape, and is arranged in a frontwardly inclined posture above the rear portion of the crankcase 52 and in front of the rear suspension unit 26.

An electric equipment storage portion 77 is mounted on the rear frame 14 behind the air cleaner 71, and an ECU 78 which constitutes a control part of the motorcycle 1 and a battery 79 are stored in the electric equipment storage portion 77.

A mud guard 80 which extends downward toward a position in front of the rear wheel 3 is mounted on a lower portion of the rear frame 14.

Figure 6:
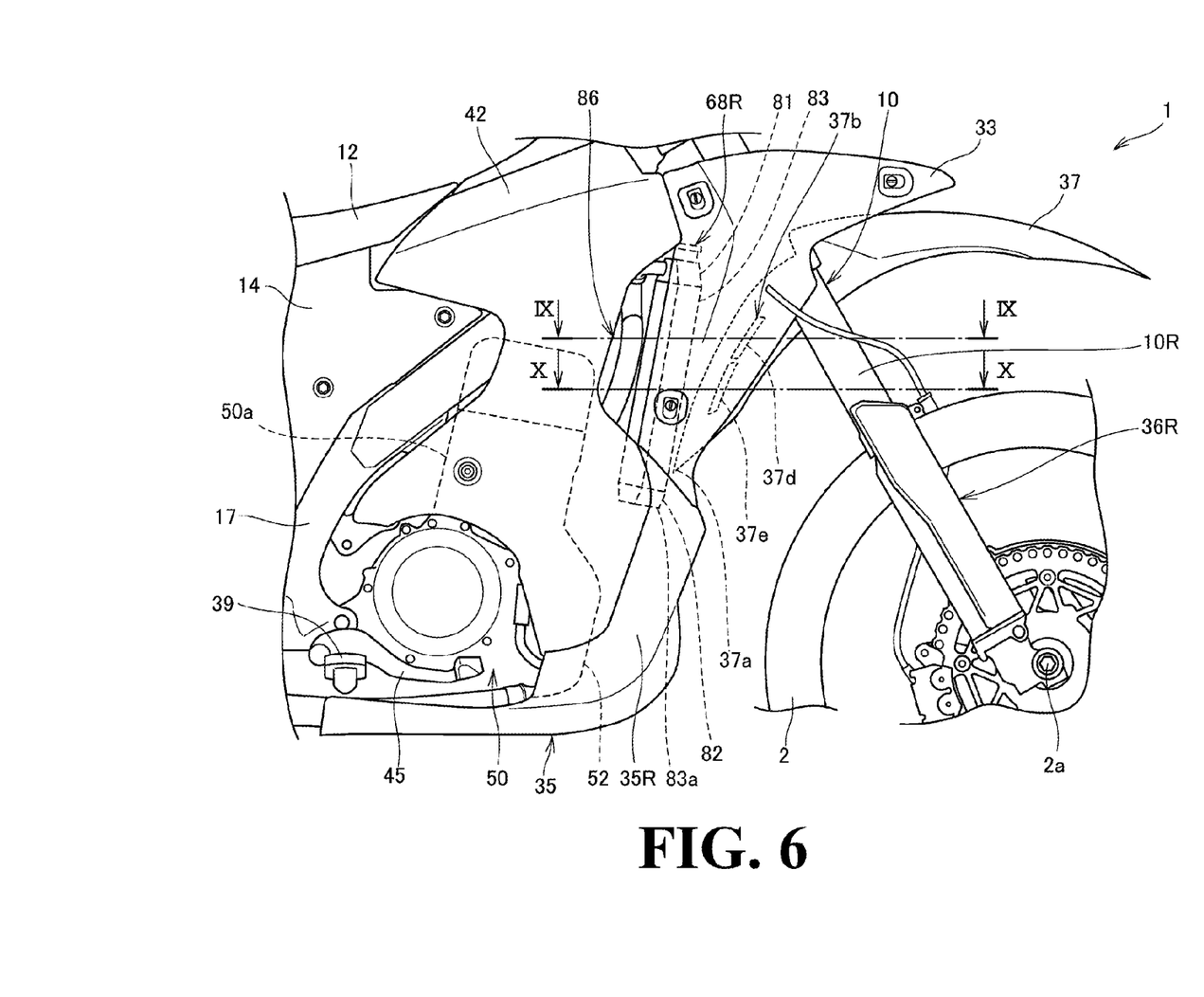
FIG. 6 is a right side view showing a part of a front portion of the motorcycle.

FIG. 6 is a right side view showing an a part of the front portion of the motorcycle 1.

The front fender 37 is fixed to a middle portion of the front fork 10 in the height direction, and a rear portion of the front fender 37 is covered with the shrouds 33 from both lateral sides thereof The pair of left and right radiators 68L and 68R (only the radiator 68R on a viewer's side shown in the drawing) is arranged behind the front fender 37.

Each radiator 68L and 68R is constituted of an upper tank 81, a lower tank 82, and a core 83 which is arranged between the upper tank 81 and the lower tank 82. The upper tank 81 and the lower tank 82 are connected to the engine 50 by way of a radiator hose respectively. The core 83 includes: a plurality of pipes which connect the upper tank 81 and the lower tank 82 to each other for allowing cooling water to flow therethrough; and heat radiation fins arranged between the respective pipes.

A lower end 37a of the front fender 37 is arranged close to a front side of the cores 83 of the radiators 68L and 68R, and is positioned above lower ends 83a of the cores 83.

The radiators 68L and 68R are arranged in front of the cylinder portion 50a of the engine 50. Most of side portions of the radiators 68L and 68R are covered with the shrouds 33, and the side portions of the radiators 68L and 68R are slightly exposed to the outside from gaps 86 between the shrouds 33 and the front tanks 41 and 42.

Figure 7:
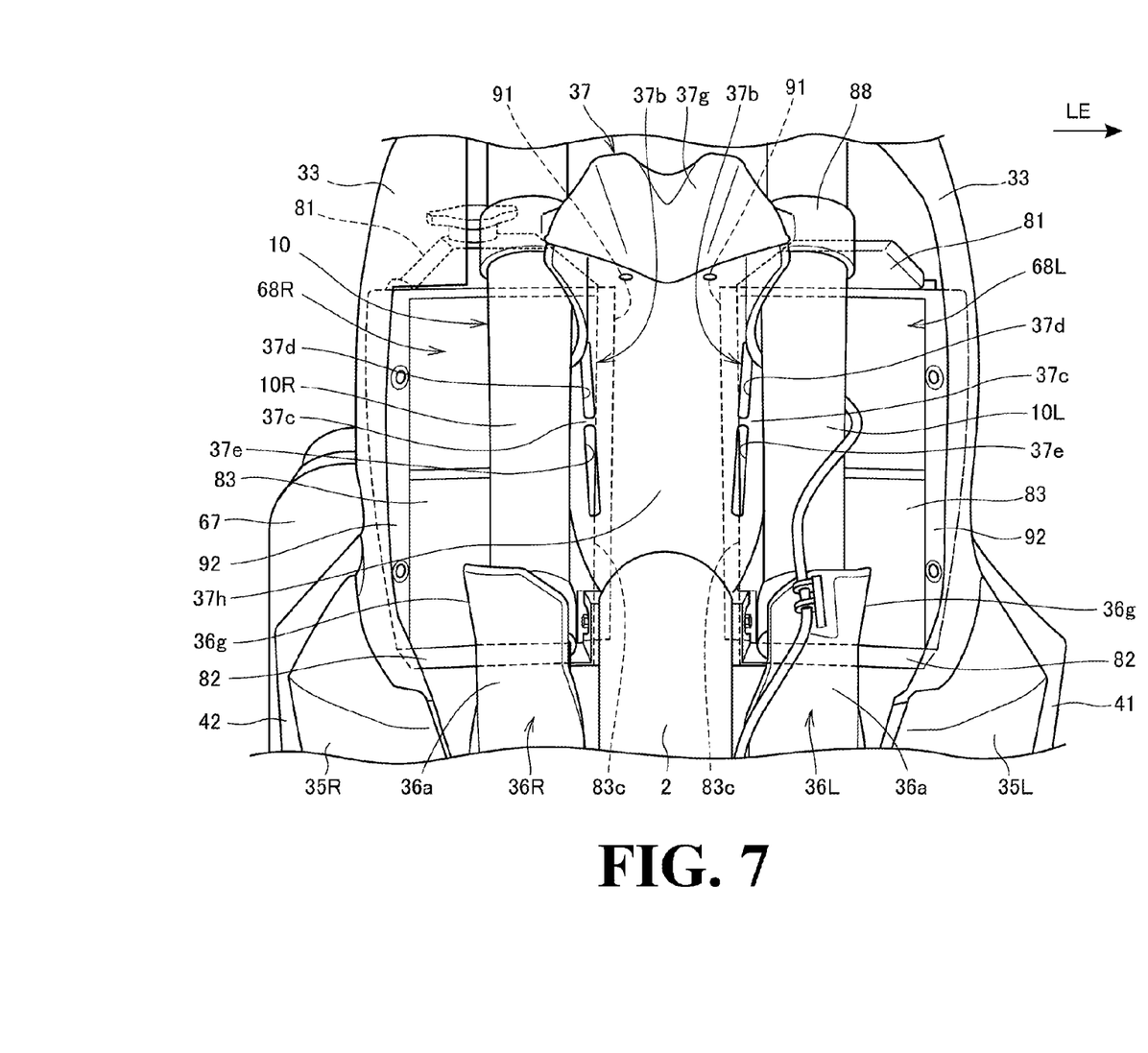
FIG. 7 is a front view showing the part of the front portion of the motorcycle.

FIG. 7 is a front view showing a part of the front portion of the motorcycle 1.

A pair of left and right fork assemblies 10L and 10R which constitutes the front fork 10 is a telescopic assembly provided with a spring and a damper, and the front wheel 2 is supported on lower ends of the fork assemblies 10L and 10R. Resin-made fork covers 36L and 36R are mounted on lower end portions of the fork assemblies 10L and 10R respectively, and the fork covers 36L and 36R protect lower portions of the fork assemblies 10L and 10R from a front side and from lateral sides respectively.

The front fender 37 is arranged between the left and right fork assemblies 10L and 10R, and is fixed to a bottom bridge 88 among a top bridge (not shown in the drawing) and the bottom bridge 88 which connect the left and right fork assemblies 10L and 10R to each other.

The front fender 37 is arranged in front of the pair of left and right radiators 68L and 68R. The front fender 37 and respective inner edges of the radiators 68L and 68R, to be more specific, the inner edges 83c of the cores 83 of the radiators 68L and 68R overlap with each other as viewed from a front side. In both side edge portions of the rear portion of the front fender 37, openings 37b which extend longitudinally approximately along the edges as viewed from a front side are formed. The openings 37b are portions for allowing traveling wind flowing toward the front fender 37 from a front side of the vehicle body to pass therethrough. The opening portions 37b overlap with the inner edges 83c of the cores 83 as viewed from a front side and, further, each opening 37b is arranged within a vertical width of the core 83 as viewed from a front side. A connecting portion 37c is formed at the approximately center of the opening 37b in the vertical direction. The opening 37b is divided in two openings, that is, an upper opening 37d and a lower opening 37e by the connecting portion 37c.

As described above, by forming the openings 37b which overlap with the inner edges 83c of the respective cores 83 of the left and right radiators 68L and 68R as viewed from a front side in the front fender 37, traveling wind is made to impinge on the radiators 68L and 68R through the openings 37b. Accordingly, a cooling effect of the radiators 68L and 68R can be enhanced. A rear portion 37h of the front fender 37 is bent such that a center portion of the rear portion 37h, in the vehicle width direction, projects rearward, in the longitudinal direction, of the vehicle body, with respect to outer sides of the rear portion 37h, in the vehicle width direction. Accordingly, there is a tendency that traveling resistance against traveling wind is increased. However, by forming the openings 37b in the rear portion 37h of the front fender 37 as in the case of this embodiment, it is possible to guide a traveling wind in front of the rear portion 37h of the front fender 37 to a position behind the rear portion 37h of the front fender 37 through the openings 37b, thus decreasing traveling resistance generated by the front fender 37. Further, by providing the connecting portion 37c to the opening 37b, the rigidity of the front fender 37 can be enhanced compared to a case where there is no such connecting portion 37c.

Upper side faces 36g which extend toward the radiators 68L and 68R are formed on upper portions 36a of the fork covers 36L and 36R respectively. Accordingly, it is possible to guide a traveling wind which impinges on the upper portions 36a of the fork covers 36L and 36R from a front side of the vehicle body to the radiators 68L and 68R by the upper side faces 36g. Due to such a constitution, a cooling effect of the radiators 68L and 68R can be enhanced.

As described above, in this embodiment, due to the openings 37b formed in the front fender 37 and the upper side faces 36g formed on the fork covers 36L and 36R, it is possible to guide traveling wind to the radiators 68L and 68R from the inside the fork assemblies 10L and 10R in the vehicle width direction and from the outside of the fork assemblies 10L and 10R in the vehicle width direction thus further enhancing a cooling effect of the radiators 68L and 68R. Further, in this embodiment, for enhancing the cooling effect of the radiators 68L and 68R, no particular parts are necessary and existing parts can be used and hence, it is possible to suppress a manufacturing cost of the motorcycle 1.

Figure 8A:
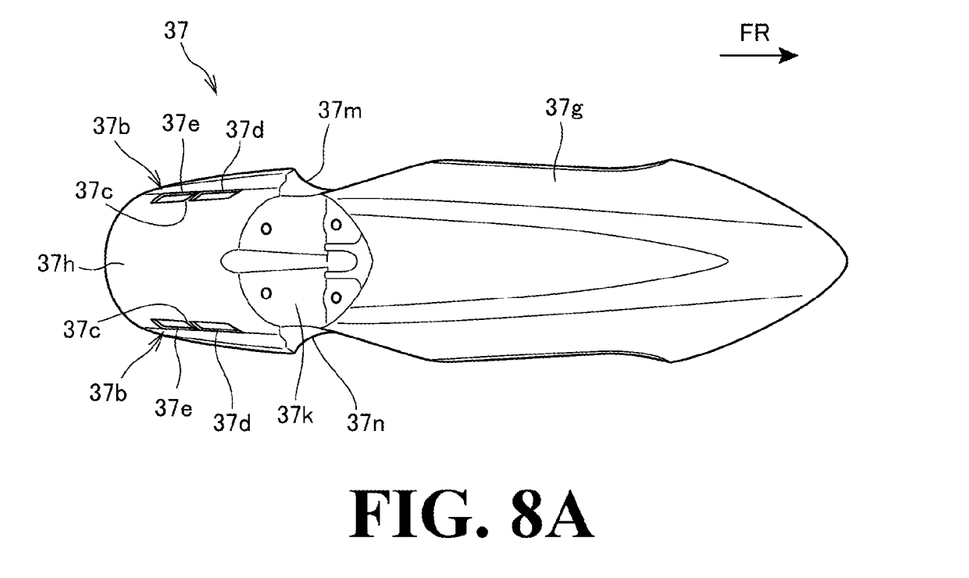
FIGS. 8A and 8B are explanatory views showing a front fender.
Figure 8B:
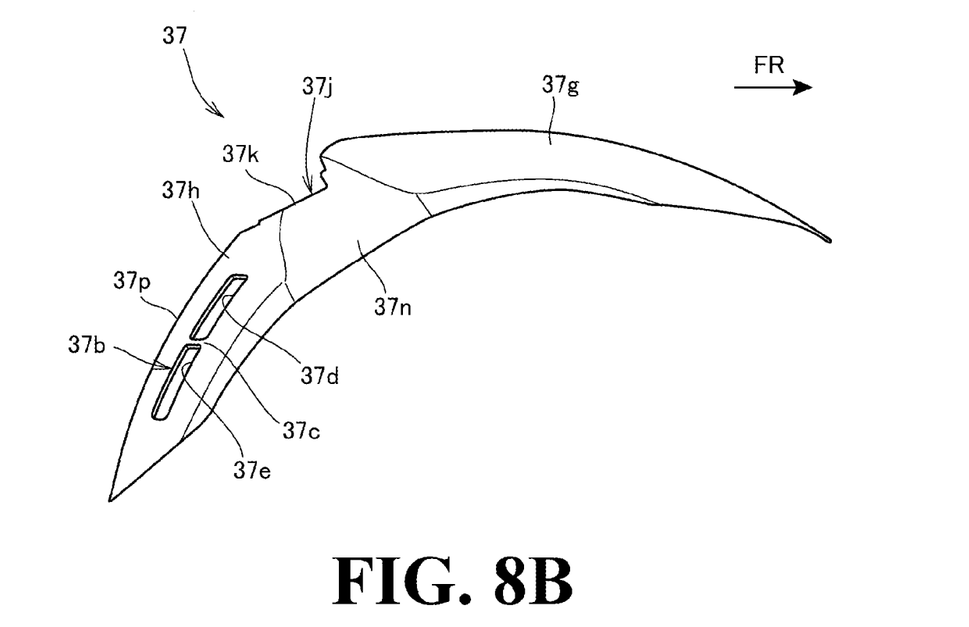

FIG. 8 is an explanatory view showing the front fender 37. FIG. 8A is a plan view of the front fender 37, and FIG. 8B is a right side view of the front fender 37.

As shown in FIG. 8A and FIG. 8B, the front fender 37 is an integral body formed of: a front portion 37g which has a front end portion thereof formed in a pointed shape and extends in the longitudinal direction of the vehicle; a rear portion 37h which extends approximately vertically; and a neck portion 37j which connects the front portion 37g and the rear portion 37h. The front fender 37 has an approximately arcuate shape as viewed in a side view as a whole.

The front portion 37g of the front fender 37 covers the front wheel 2 (see FIG. 6) from above, and the rear portion 37h covers the front wheel 2 from an upper oblique rear side. The neck portion 37j is constituted of an upper recessed portion 37k and left and right side recessed portions 37m and 37n. The upper recessed portion 37k is a portion fixed to the bottom bridge 88 (see FIG. 7). The side recessed portions 37m and 37n are portions provided for avoiding the interference between the front fender 37 and the left and right fork assemblies 10L and 10R (see FIG. 7).

The pair of left and right openings 37b is formed in the rear portion 37h at positions close to edges of the rear portion 37h such that the openings 37b extend in the substantially longitudinal direction, as viewed in a plan view, and extend along a rear face 37p having an approximately arcuate shape, as viewed in a side view.

Next, the manner of operation of the above-mentioned openings 37b formed in the front fender 37 is explained.

Figure 9:
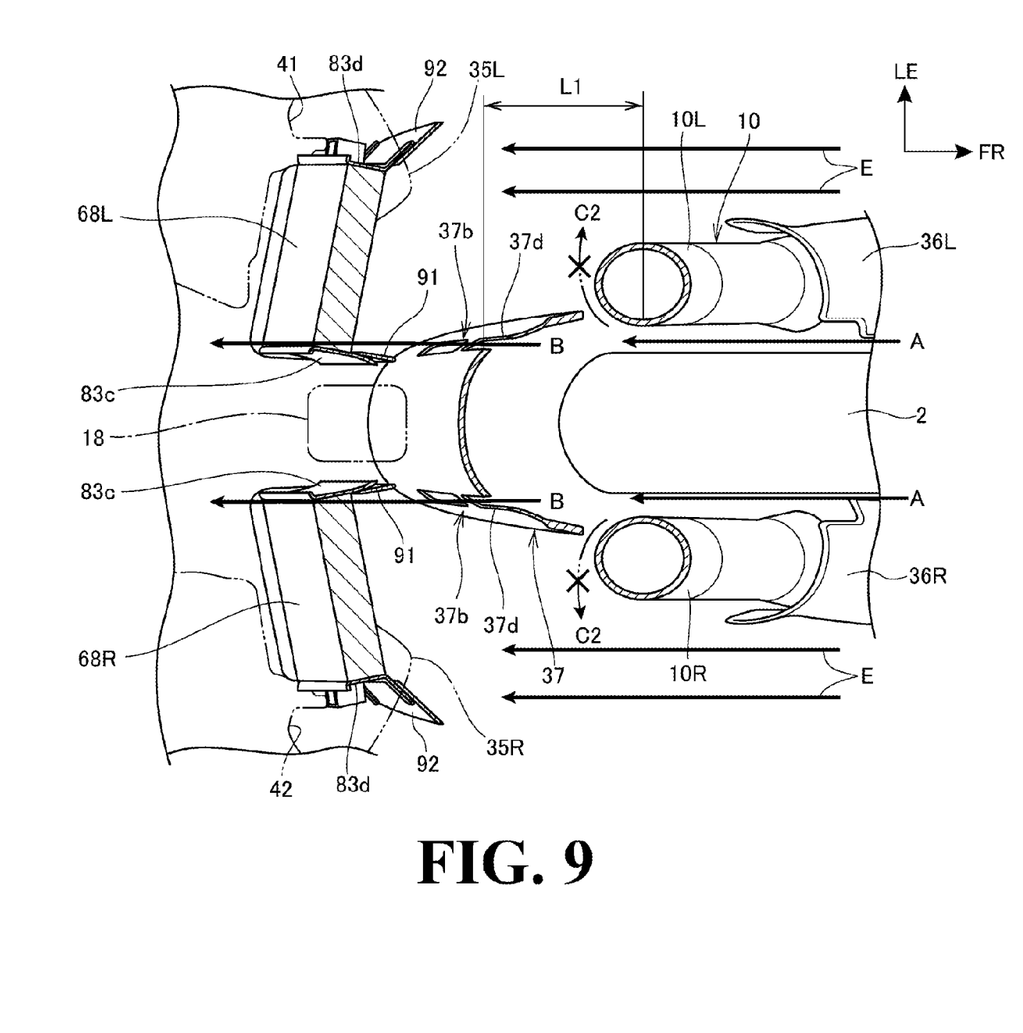
FIG. 9 is an operational view showing an operation of upper openings formed in the front fender.

FIG. 9 is an operational view showing the manner of operation of the upper openings 37d formed in the front fender 37, and shows a cross section taken along a line IX-IX in FIG. 6. Here, the constitution shown in FIG. 9 is explained along with a comparison example shown in FIG. 11.

As shown in FIG. 9, when the vehicle is in a traveling state, as indicated by arrows A, traveling wind which flows inside the left and right fork assemblies 10L and 10R of the front fork 10 toward a rear side of the vehicle passes through the upper openings 37d formed in the front fender 37 as indicated by arrows B and, then, passes outside the inner edges 83c, of the radiators 68L and 68R in the vehicle width direction. As a result, the radiation of heat from the radiators 68L and 68R is accelerated so that a cooling effect of the radiators 68L and 68R is enhanced.

Figure 11:
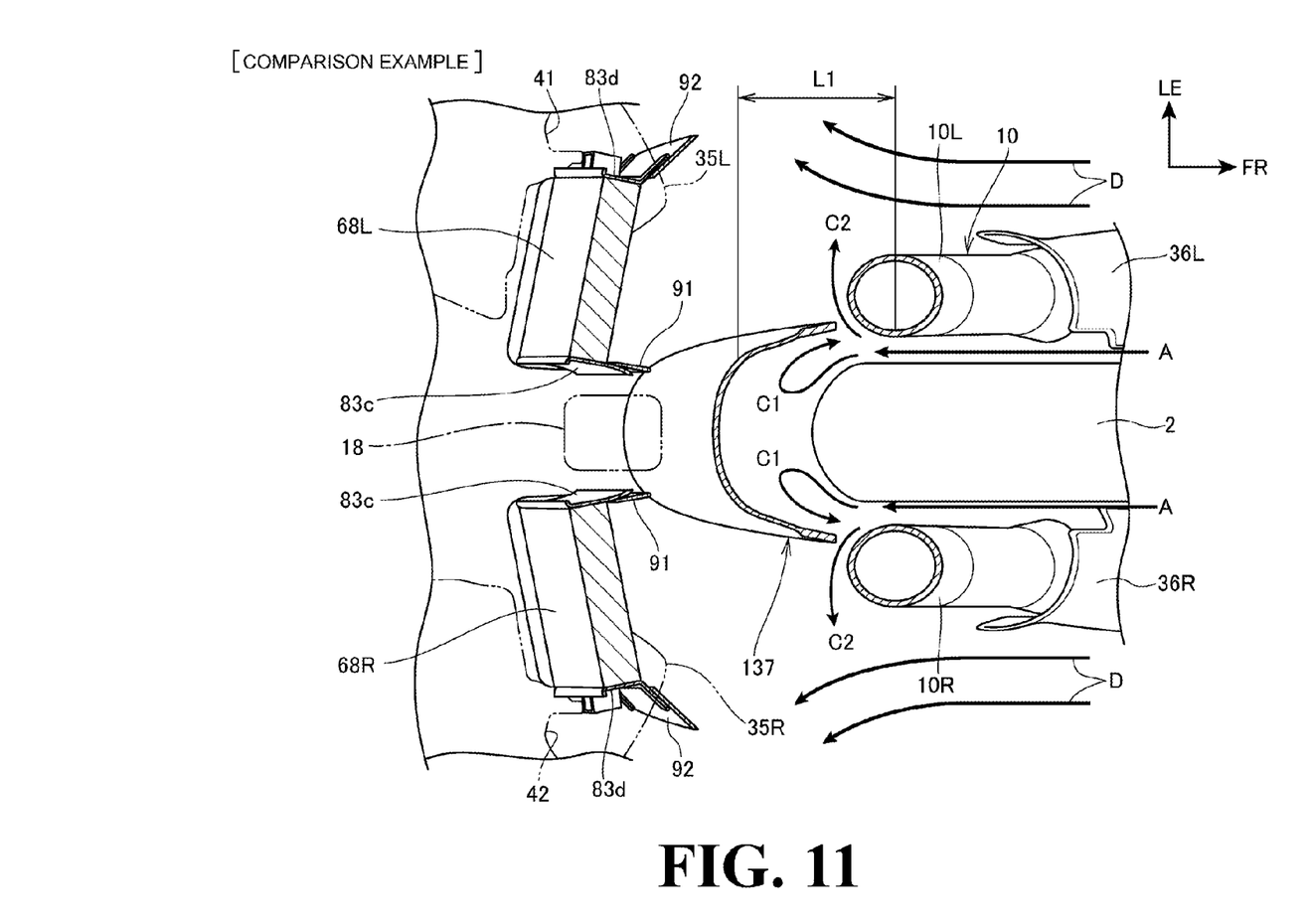
FIG. 11 is an operational view showing an operation of a front fender of a comparison example.

In this case, a distance L1 between the fork assembly 10L and 10R and the upper opening 37d is relatively short. Accordingly, when openings are not formed in the front fender 137 as shown in FIG. 11, for example, the flow of air inside the front fender 137 stagnates and hence, traveling wind which flows as indicated by arrows A passes through gaps formed between the fork assemblies 10L and 10R and the front fender 137. Then, the direction that the traveling wind flows is changed by a convection flow of air which flows inside the front fender 137 such as traveling wind indicated by arrows C1 so that the direction of the flow of air is sharply changed in the lateral direction of the vehicle body as indicated by arrows C2 and hence, traveling resistance is increased. Further, a traveling wind which flows outside the front fork 10 in the vehicle width direction as indicated by arrows D is interrupted by the flow of air indicated by arrows C2 so that it becomes difficult for the traveling wind to flow toward the radiators 68L and 68R.

Returning to FIG. 9, since the flow of air indicated by the arrows C2 does not exist, traveling wind which flows outside the front fork 10 in the vehicle width direction as indicated by arrows E is guided to the radiators 68L and 68R without being obstructed by the flow of air indicated by the arrows C2. Accordingly, by forming the upper openings 37d in the front fender 37, a large traveling resistance reduction effect can be acquired.

In the drawings, symbols 91 and 92 indicate guide plates which are mounted on the inner edges 83c and the outer edges 83d of the cores 83 of the radiators 68L and 68R respectively. The guide plates 91 and 92 accelerate the introduction of traveling wind to the cores 83. The guide plates 91 extend toward the openings 37b or extend toward the inside of the openings 37b in the vehicle width direction. The guide plates 92 extend obliquely frontward and outward.

Figure 10:
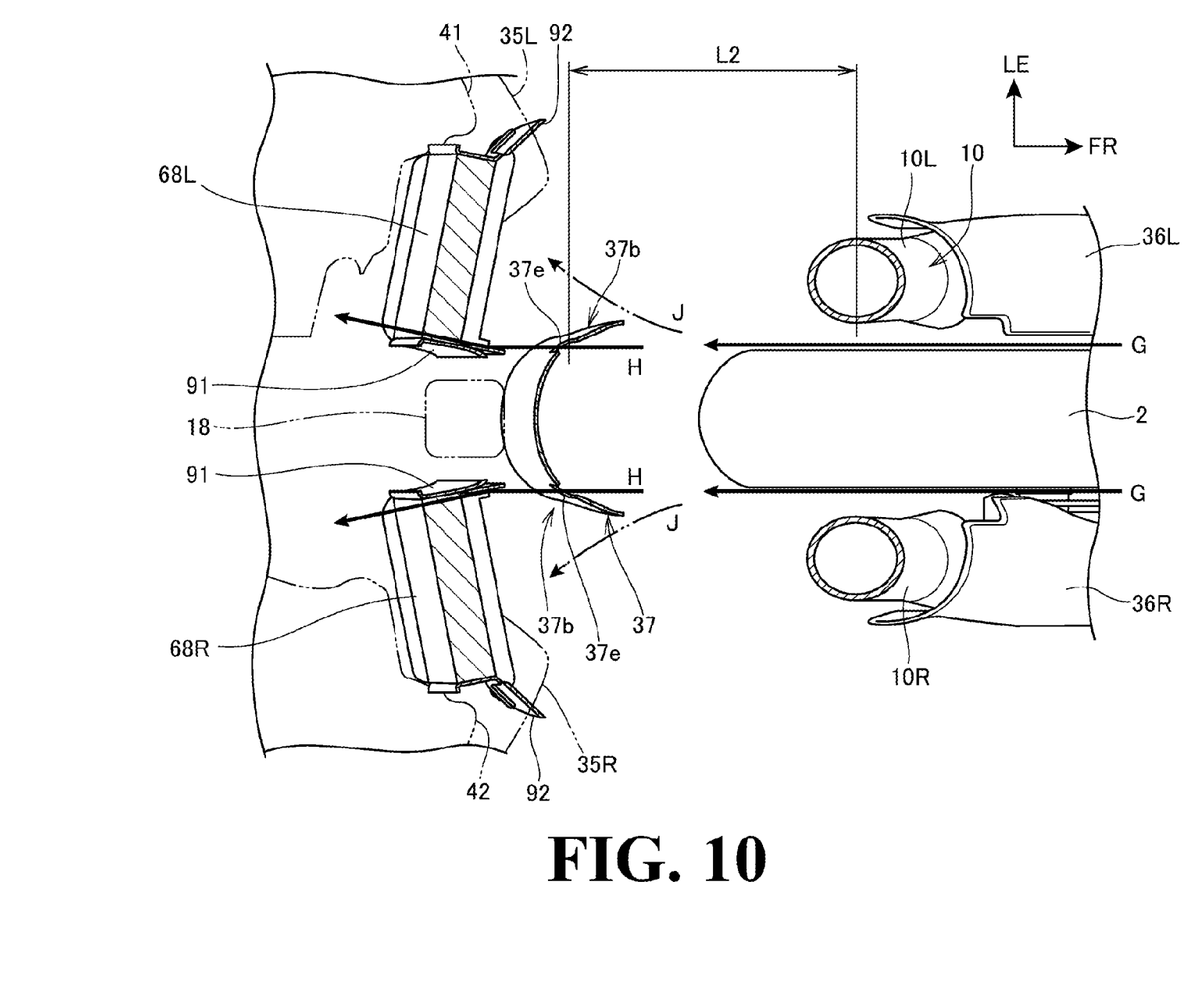
FIG. 10 is an operational view showing an operation of lower openings formed in the front fender.

FIG. 10 is an operational view showing the manner of operation of the lower openings 37e formed in the front fender 37, and shows a cross section taken along a line X-X in FIG. 6.

When the vehicle is in a traveling state, traveling wind which flows toward a rear side of the vehicle inside the left and right fork assemblies 10L and 10R of the front fork 10 as indicated by arrows G passes through the lower openings 37e formed in the front fender 37 as indicated by arrows H and, then, is guided by the guide plates 91 which are mounted on the inner edges of the radiators 68L and 68R, and passes through the insides of the radiators 68L and 68R. As a result, the radiation of heat from the radiators 68L and 68R is accelerated so that a cooling effect of the radiators 68L and 68R is enhanced.

In this case, a distance L2 between the fork assemblies 10L and 10R and the lower openings 37e is longer than the distance L1 shown in FIG. 9. Accordingly, for example, when the openings 37b including the lower openings 37e are not formed in the front fender 37, the flow of air inside the front fender 37 stagnates. However, traveling wind which flows as indicated by arrows G passes through gaps formed between the fork assemblies 10L and 10R and the front fender 37, and passes the lateral sides of the front fender 37 and flows toward a radiator 68L and 68R side as indicated by arrows J of a double-dashed-chain line. In this case, a change in direction of the traveling wind is small. Accordingly, traveling resistance reduction effect acquired by forming the lower openings 37e is smaller than a traveling resistance reduction effect acquired by the constitution shown in FIG. 9.

The respective inner edges 83c of the left and right radiators 68L and 68R and the openings 37b overlap with each other respectively in the longitudinal direction of the vehicle body. Accordingly, for example, when the guide plates 91 are not mounted on the radiators 68L and 68R or when an area of the guide plate 91 is made small, some of the traveling wind which impinges on the respective inner edges 83c of the radiators 68L and 68R is made to pass through inside the radiators 68L and 68R and, on the other hand, some of the traveling wind is made to flow inside the radiators 68L and 68R so that an amount of the traveling wind which impinges on the radiators 68L and 68R is decreased. Accordingly, it is possible to adjust an amount of the traveling wind such that traveling resistance generated by the radiators 68L and 68R is decreased.

As shown in FIG. 9 and FIG. 10, by forming the openings 37b in the front fender 37, traveling resistance generated by the front fender 37 can be decreased and, at the same time, traveling wind can be made to impinge on the left and right radiators 68L and 68R which are arranged behind the front fender 37 through the openings 37b so that traveling resistance can be decreased and the cooling property can be enhanced.

Further, by forming the plurality of openings (upper openings 37d and lower openings 37e) in the front fender 37 such that the openings are arranged parallel to each other in the vertical direction, traveling resistance reduction effect can be increased at the upper opening 37d arranged on an upper side, and traveling resistance reduction effect is decreased at the lower opening 37e arranged on a lower side. Accordingly, traveling resistance can be adjusted corresponding to the positions of the plurality of openings in the vertical direction and the number of the plurality of openings arranged parallel to each other in the vertical direction.

As shown in FIG. 7 and FIG. 9, by forming the openings 37b in the front fender 37 at positions close to the outer edges of the rear portion 37h, in the vehicle width direction, the openings 37b can be more inclined with respect to the longitudinal direction of the vehicle body so that the openings 37b are directed to the inside in the vehicle width direction. Accordingly, areas of the openings 37b in the longitudinal direction of the vehicle body can be further decreased and hence, for example, it is possible to prevent mud, pebbles and the like scattered from the front wheel 2 from passing through the openings 37b, thus making the scattering of mud, pebbles and the like toward the radiators 68L and 68R side difficult. With respect to the traveling wind, the direction of flow of the traveling wind is changed more easily than the above-mentioned mud, pebbles and the like and hence, the influence of the decrease of the areas on traveling wind is small. Further, by forming the plurality of openings (upper openings 37d and lower openings 37e) parallel to each other in the vertical direction respectively, a lateral width of an area of each openings can be approximately uniform whereby it is possible to prevent scattering objects from passing through any one of the openings in the same manner.

As shown in the above-mentioned FIG. 2, FIG. 6 and FIG. 7, the motorcycle 1 includes: the main frame 16 which extends rearward and downward from the head pipe 15; the engine 50 which has the cylinder axis extending in the vertical direction and is arranged below the main frame 16; the radiators 68L and 68R which are arranged in front of the engine 50; the front fork 10 which is supported on the steering shaft which is rotatably supported on the head pipe 15; the bottom bridge 88 as a bridge which connects the intermediate portions of the left and right fork assemblies 10L and 10R which constitute the front fork 10; and the front fender 37 which is arranged below the bottom bridge 88 and between the left and right fork assemblies 10L and 10R, and covers the front wheel 2 from above. The radiators 68L and 68R are provided as a pair of left and right radiators, respective inner edges 83c of the left and right radiators 68L and 68R and the front fender 37 overlap with each other as viewed from a front side, and a pair of left and right openings 37b which extends in the vertical direction is formed in the rear portion of the front fender 37.

Due to such a constitution, the pair of left and right openings 37b formed in the front fender 37 allows traveling wind to pass therethrough and hence, a traveling resistance generated by the front fender 37 can be decreased and, at the same time, the traveling wind which passes through the openings 37b is made to impinge on the radiators 68L and 68R and hence, the cooling effect of the radiators 68L and 68R can be enhanced. Further, by merely forming the openings 37b in the front fender 37, traveling resistance generated by the front fender 37 can be reduced and the cooling property of the radiators 68L and 68R can be enhanced at a low cost.

The openings 37b are arranged within a vertical width of the radiators 68L and 68R and hence, traveling wind which passes through the openings 37b impinge on the radiators 68L and 68R whereby the cooling effect of the radiators 68L and 68R can be further enhanced.

The openings 37b are divided into upper and lower openings at a middle portion thereof. By dividing the openings 37b into the upper and lower openings at the middle portion thereof, by connecting middle parts of the opening 37b, rigidity of the front fender 37 can be enhanced.

The respective inner edges 83c of the left and right radiators 68L and 68R and the openings 37b overlap with each other as viewed from a front side and hence, some of the traveling wind which impinges on the inner edges 83c of the left and right radiators 68L and 68R through the openings 37b can be made to flow inside the radiators 68L and 68R in a vehicle width direction, whereby traveling resistance can be suppressed, compared to a case where the traveling wind is made to impinge on the center portions of the radiators 68L and 68R.

The guide plates 91 which constitute the guides are provided to the inner edges 83c of the radiators 68L and 68R respectively, in an extending manner toward the openings 37b. Hence, the traveling wind which flows toward the inner edges 83c of the radiators 68L and 68R from the openings 37b can be guided to the radiators 68L and 68R by the guide plates 91 whereby an amount of the traveling wind which impinges on the radiators 68L and 68R can be increased thus further enhancing the cooling effect of the radiators 68L and 68R.

The above-mentioned embodiment merely shows one mode of carrying out the invention, and various modifications and variations are desirably conceivable without departing from the gist of the invention.

For example, in the above-mentioned embodiment, as shown in FIG. 7, the opening 37b is divided into two openings in the vertical direction. However, the invention is not limited to such a constitution, and the opening may be divided into three or more openings in the vertical direction.

The invention is applicable not only to the motorcycle 1 but also to saddle-ride-type vehicles including vehicles other than the motorcycle. The saddle-ride-type vehicle is a vehicle which includes vehicles in general where a rider is seated on a vehicle body in a straddling manner, and covers not only a motorcycle (bicycle with a prime mover part) but also a three-wheeled vehicle and a four-wheeled vehicle classified into ATV (all terrain vehicles).

We claim:

1. A saddle-type vehicle, comprising:
a head pipe;
a main frame which extends rearward and downward from said head pipe;
an engine disposed below said main frame;
a pair of left and right radiators provided in front of said engine;
a steering shaft rotatably supported on said head pipe;
a front fork supported on said steering shaft, said front fork comprising left and right fork assemblies;
a bridge which connects intermediate portions of said left and right fork assemblies; and
a front fender disposed below said bridge and between said left and right fork assemblies, said front fender covering a front wheel from above,
wherein an inner edge of said left radiator and said front fender overlap with each other, when viewed in a vehicle front view,
wherein an inner edge of said right radiator and said front fender overlap with each other, when viewed in the vehicle front view,
wherein a pair of left and right openings are formed in a rear portion of said front fender, said pair of left and right openings extending in a vertical direction, and
wherein said front fender is configured such that traveling wind flows from a side of said front fender which faces said front wheel to a side of said front fender which faces said pair of left and right radiators, via said pair of left and right openings, wherein a left guide plate is provided on said inner edge of said left radiator, said left guide plate extending towards said left opening, and wherein a right guide plate is provided on said inner edge of said right radiator, said right guide plate extending towards said right opening.

2. The saddle-type vehicle according to claim 1,
wherein said inner edge of said left radiator and said left opening overlap with each other, when viewed in the vehicle front view, and
wherein said inner edge of said right radiator and said right opening overlap with each other, when viewed in the vehicle front view.

3. The saddle-type vehicle according to claim 1, wherein said left opening formed in the fender is aligned within a vertical height of said left radiator, and wherein said right opening formed in the fender is aligned within a vertical height of said right radiator.

4. The saddle-type vehicle according to claim 3, wherein said left opening formed in the fender is divided into an upper opening and a lower opening, and wherein said right opening formed in the fender is divided into an upper opening and a lower opening.

5. The saddle-type vehicle according to claim 4,
wherein said inner edge of said left radiator and said left opening overlap with each other, when viewed in the vehicle front view, and
wherein said inner edge of said right radiator and said right opening overlap with each other, when viewed in the vehicle front view.

6. The saddle-type vehicle according to claim 3,
wherein said inner edge of said left radiator and said left opening overlap with each other, when viewed in the vehicle front view, and
wherein said inner edge of said right radiator and said right opening overlap with each other, when viewed in the vehicle front view.

7. The saddle-type vehicle according to claim 1, wherein said left opening formed in the fender is divided into an upper opening and a lower opening, and wherein said right opening formed in the fender is divided into an upper opening and a lower opening.

8. The saddle-type vehicle according to claim 7,
wherein said inner edge of said left radiator and said left opening overlap with each other, when viewed in the vehicle front view, and
wherein said inner edge of said right radiator and said right opening overlap with each other, when viewed in the vehicle front view.

* * * * *